United States Patent [19]

Bedsole

[11] Patent Number: 5,227,061
[45] Date of Patent: Jul. 13, 1993

[54] FUEL/CONTAMINANT SEPARATOR

[76] Inventor: Robert D. Bedsole, 1501 Shadow Oaks Pl., Charlottesville, Va. 22901

[21] Appl. No.: 819,803

[22] Filed: Jan. 13, 1992

[51] Int. Cl.$^5$ ............................................. B01D 21/26
[52] U.S. Cl. ..................... 210/304; 210/295; 210/299; 210/305; 210/307; 210/360.1; 210/512.1
[58] Field of Search ............... 210/113, 143, 295, 299, 210/303, 304, 305, 307, 309, 313, 360.1, 512.1

[56] References Cited

U.S. PATENT DOCUMENTS

| | | | |
|---|---|---|---|
| 2,706,045 | 4/1955 | Large | 209/211 |
| 3,171,807 | 3/1965 | Neuman | 210/319 |
| 3,386,588 | 6/1968 | Ades | 210/512.2 |
| 3,698,555 | 10/1972 | Conner | 210/304 |
| 3,771,290 | 11/1973 | Stethem | 210/304 |
| 4,035,302 | 7/1977 | Seo et al. | 210/304 |
| 4,170,555 | 10/1979 | Vicard | 210/788 |
| 4,205,710 | 6/1980 | Dudicz | 141/9 |
| 4,312,751 | 1/1982 | Casamitana | 210/94 |
| 4,516,994 | 5/1985 | Kocher | 55/337 |
| 4,690,759 | 9/1987 | Mandy | 210/304 |
| 4,865,751 | 9/1989 | Smisson | 210/788 |
| 4,882,046 | 11/1989 | Waite | 210/195.3 |
| 4,906,264 | 3/1990 | Szymaszek et al. | 55/324 |
| 4,964,994 | 10/1990 | Wakley et al. | 210/512.1 |
| 4,976,854 | 12/1990 | Yano et al. | 210/304 |
| 4,995,992 | 2/1991 | Hurner | 10/312 |

*Primary Examiner*—Robert A. Dawson
*Assistant Examiner*—David Reifsnyder
*Attorney, Agent, or Firm*—Richard C. Litman

[57] ABSTRACT

A fuel/contaminant separator (10) designed to separate water and contaminants out of fuels used for products for combustion. The contaminated fuel (12) enters the fuel/contaminant separator (10) via the inlet pipe (14) located in the upper portion of the fuel/contaminant separator (10). A curved nozzle assembly (16) located at the periphery of the fuel/contaminant separator (10) cause a centrifugal effect to take place making separation similar to that achieved by elaborate mechanical centrifuges. In the collection section (26), minute particles of water and solid contaminants collect at the perforations of the perforated cone filter (28 or 38) where they accumulate and fall to the bottom of the collection section (26). The lighter fuel particles remain in suspension and flow up the center of the fuel/contaminant separator (10) to the outlet pipe (30).

4 Claims, 1 Drawing Sheet

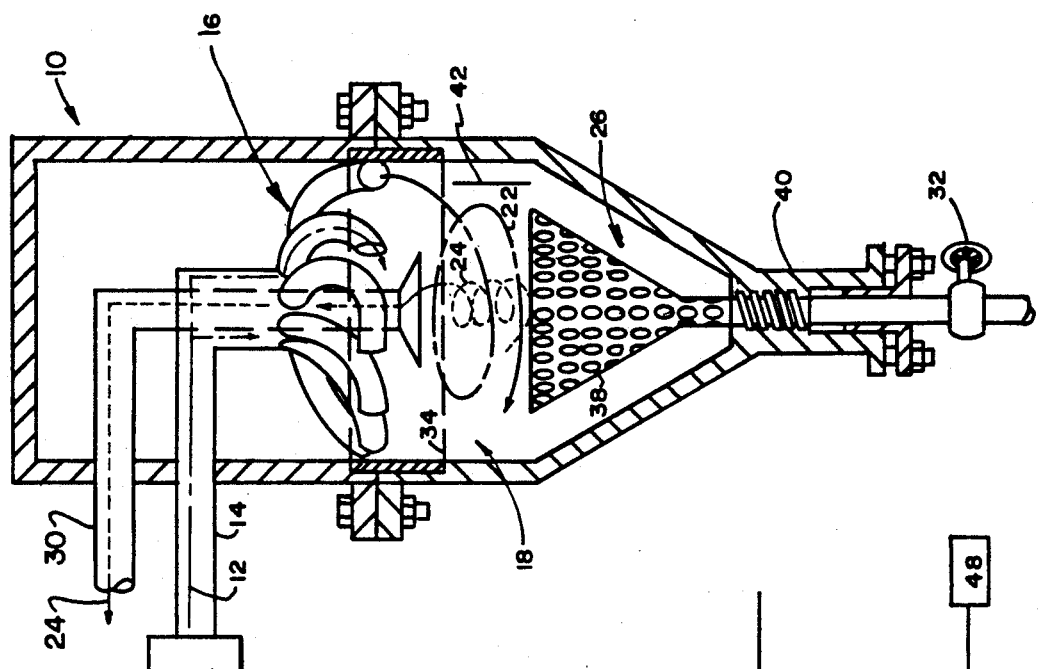
FIG. 2
FIG. 3
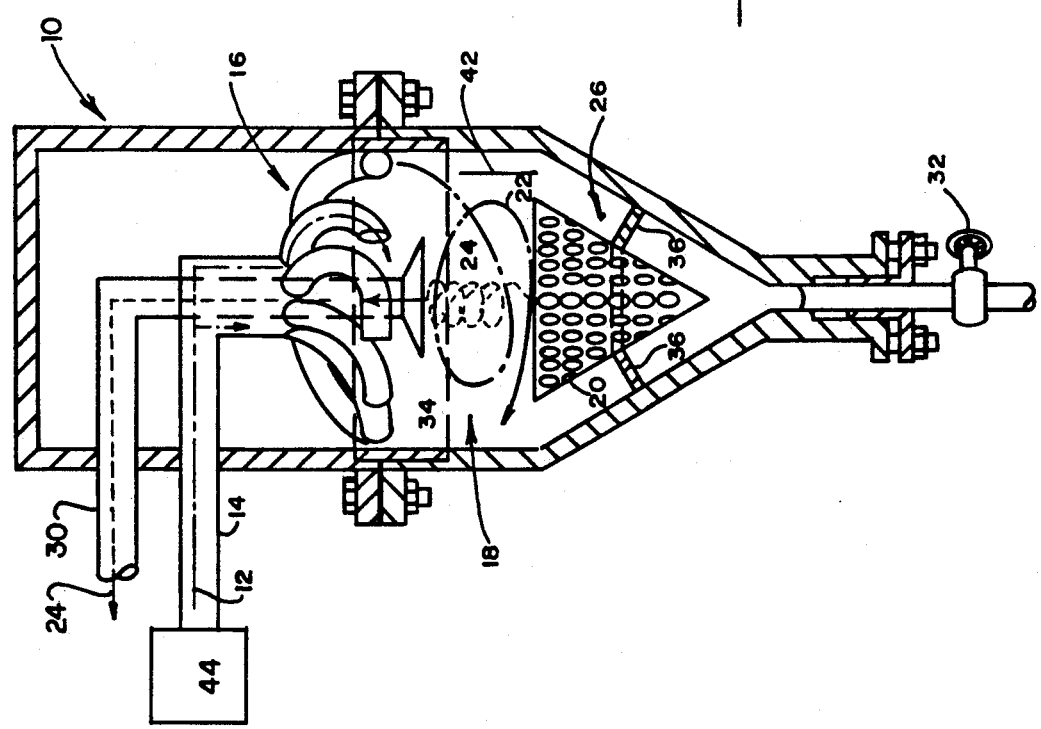
FIG. 1

FUEL/CONTAMINANT SEPARATOR

BACKGROUND OF THE INVENTION

1. Field of the Invention

This invention relates generally to a fluid/solid separator using a plurality of curved nozzles and a perforated cone filter to separate water and contaminants out of fuels used for products for combustion.

2. Description of the Related Prior Art

It is well known to employ separate water and solid contaminant filters and separators, manufactured as self-contained units, to remove water and solid contaminants from fuel. Use of these units involve inconvenience and loss of time because they have to be removed from their mounting positions and fuel lines, connections, and clamps have to be removed in order to change the filter elements, etc. for cleaning and maintenance purposes. They also have to be disassembled and sent back to their manufacturers for repair when skilled maintenance personnel or appropriate parts are not easily obtained. Among the fluid/solid separators that have been proposed are those shown in the U.S. Patents identified below. These Patents and their applicability to this invention are discussed in four different groups.

The group of Patents comprised of U.S. Pat. No. 4,906,264 issued to Szymaszek et al. on Mar. 6, 1990 and U.S. Pat. No. 3,171,807 issued to Neuman on Mar. 2, 1965 is most relevant to this invention. These two Patents each show a liquid separating apparatus which includes a curved input port to create centrifugal action by the liquid. However, Szymaszek et al. and Neuman both have only one curved port.

The group of Patents comprised of U.S. Pat. No. 4,964,994 issued to Wakley et al. on Oct. 23, 1990, U.S. Pat. No. 4,690,759 issued to Mandy on Sep. 1, 1987, U.S. Pat. No. 4,516,994 issued to Kocher on May 14, 1985, U.S. Pat. No. 4,312,751 issued to Casamitjana on Jan. 26, 1982, U.S. Pat. No. 4,170,555 issued to Vicard on Oct. 9, 1979, U.S. Pat. No. 3,386,588 issued to Ades on Jun. 4, 1968, and U.S. Pat. No. 2,706,045 to Large on Apr. 12, 1955 collectively show various ways of creating a centrifugal effect in the fluid to be separated in a fluid separator. However, none of the Patents in this group disclose causing this centrifugal effect with one or more curved nozzles.

The group of Patents comprised of U.S. Pat. No. 4,995,992 issued to Hurner on Feb. 26, 1991, U.S. Pat. No. 4,882,046 issued to Waite on Nov. 21, 1989, U.S. Pat. No. 4,865,751 issued to Smisson on Sep. 12, 1989, and U.S. Pat. No. 4,035,302 issued to Seo et al. on Jul. 12, 1977 collectively show various fluid separators with bottom filters. However, none of the Patents in this group disclose a filter comprised of a perforated cone filter.

U.S. Pat. No. 4,205,710 issued to Dunicz on Jun. 3, 1980 discloses a cone filter with a perforated sleeve that acts as a strainer. However, this Patent does not consist of the perforations being an integral part of the cone filter.

There is need for an improved fuel/contaminant separator whereby both liquid and solid contaminants can be economically separated from fuel by a single, easily maintained unit. The present invention is intended to satisfy this need.

SUMMARY AND OBJECTS OF THE INVENTION

By the present invention, an improved fuel/contaminant separator consisting of a single unit to handle both liquid and solid contaminants is proposed. The fuel metering components of machinery (i.e., internal combustion engines) are very prone to mechanical damage by contaminants in fuel such as water, solids, and rust and bacteria (by-products of water in fuel tanks). The present invention has several advantages over the prior art inventions:

(1) There are no moving parts.
(2) There is a nozzle design at the periphery of the inside of the fuel/contaminant separator which has the same effect as mechanical centrifuges or other expensive equipment.
(3) There is an ability to process liquids with a specific gravity of less than 1.0.
(4) There is an ability to operate at high temperatures so that water and other contaminants can be removed from residual fuels at such temperatures.
(5) There is an ability to clean the fuel/contaminant separator quickly without skilled personnel, if necessary.
(6) There are a minimum of parts requiring replacement and maintenance, making the present invention more inexpensive and cost-effective than the prior art inventions.
(7) There is an ability to quickly separate the fuel from the water and other contaminants, wherein the contaminants are collected in a collection section.

It is an object of this invention to provide an improved fuel/contaminant separator including an inlet pipe leading to a plurality of curved nozzles that are along the periphery of the fuel/contaminant separator to cause a centrifugal effect to make separation similar to that achieved by elaborate mechanical centrifuges.

It is another object of this invention to provide an improved fuel/contaminant separator including a perforated cone filter which may or may not be adjustable so that minute particles of water and contaminants collect at the perforations and fall to the bottom of a collection section.

It is another object of this invention to provide an improved fuel/contaminant separator including lighter fuel particles which remain in suspension and flow up the center of the fuel/contaminant separator to an outlet pipe that leads to fuel tanks, engines, or other clean storage systems.

It is another object of this invention to provide an improved fuel/contaminant separator including a collection area where the velocity of the separated liquid is reduced to cause the liquid and solid contaminants to accumulate for removal.

It is another object of this invention to provide an improved fuel/contaminant separator including a drain valve which can be opened to remove all contaminants without taking the separator out of service.

It is another object of this invention to provide an improved fuel/contaminant separator including an assembly with no moving parts which makes the operation and maintenance of the fuel/contaminant separator simple and efficient while being able to separate the contaminants out of all fuel grades including contaminants with a specific gravity of less than 1.0 while operating at a wide range of temperatures.

It is another object of this invention to provide an improved fuel/contaminant separator including a replaceable wear sleeve to make the fuel/contaminant separator more economical to operate by preventing the interior of the fuel/contaminant separator from being eroded away by foreign particles or cavitation that might otherwise result from the high velocity of the process liquid.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 1 is a sectional view of an embodiment of the fuel/contaminant separator; and FIG. 2 is a sectional view of another embodiment of the fuel/contaminant separator.

Similar reference characters designate corresponding parts throughout the several figures of the drawings.

DETAILED DESCRIPTION OF THE PREFERRED EMBODIMENTS

The fuel/contaminant separator (10) illustrated in FIG. 1 operates by the contaminated fuel (12) to be processed entering the fuel/contaminant separator (10) through the inlet pipe (14) by way of an external high pressure transfer pump (44) to the curved nozzle assembly (16) where a centrifugal effect in an interface area (42) is imparted to the contaminated fuel (12). This centrifugal effect is caused by the contaminated fuel (12) entering the curved nozzle assembly (16) at high speed due to the high pressure imparted by the high pressure transfer pump. The centrifugal effect imparted to the contaminated fuel (12) on the periphery of the separation section (18) between the curved nozzle assembly (16) and the perforated cone filter (20) causes the liquid/solid contaminants (22) to form an interface between the contaminants (22) and the clean fuel (24) in the separation section (18) of the fuel/contaminant separator (10). Since the water/solids have a specific gravity higher than the clean fuel (24), the interface between the contaminants (22) and the clean fuel (24) is formed more efficiently with the increased velocity in the separation section (18) which causes the heavier contaminants (22) to collect in the bottom of the collection section (26) which is located in the lower portion of the fuel/contaminant separator (10). The curved nozzle assembly (16) is located downward 30 degrees in the separation section (18) thereby allowing the fluids/solids interface to take place within the collection section (26). The uniqueness of this curved nozzle assembly design wherein the curved nozzles are located at the periphery of the fuel/contaminant separator (10) over the conventional designs of gravity separation with inlet cones is that when the processed liquid (22, 24) enters the separation section (18) at a high velocity it causes a centrifugal effect to take place making the separation similar to that achieved by elaborate mechanical centrifuges. A replaceable wear sleeve (34) makes the unit more economical to operate than a unit where there is no replaceable wear sleeve wherein the interior of the fuel/contaminant separator (10) would be eroded away by foreign particles or cavitation which might result from the high velocity of the contaminated fuel (12).

In the collection section (26), minute particles of water and other contaminants collect at the perforations of the perforated cone filter (20), supported by two support rods (36), where they accumulate and fall to the bottom of the collection section (26). This accumulation of contaminant particles is caused by the reduction of the velocity of the processed liquid (22, 24) while the lighter fuel particles (24) remain in suspension and flow up the center of the separation section (18) to the outlet pipe (30) where it is led to fuel tanks, engines, or other clean storage systems. All liquid/solid contaminants (22) can be removed without taking the unit out of service by simply opening a drain valve (32) located at the bottom of the collection section (26) until all impurities are removed. This can be accomplished either manually (32) or by using a solenoid valve (46) activated by electrical sensors (48).

FIG. 2 shows an alternative construction of which the main components correspond to those of FIG. 1. These components are given the same reference numerals as in FIG. 1 and will not be described again. In the construction of FIG. 2, the perforated cone filter (38), instead of being supported by the support rods (36), is supported by means of an attached thread screw (40) whereby the perforated cone filter (38) is able to be easily replaced by any of a number of different sized perforated cone filters. The purpose in having the perforated cone filter (38) to be easily adjusted in size in this way is to compensate for different specific gravities of fuel and a wide range of temperatures.

These simple designs with no moving parts make operation and maintenance simple and efficient while separating water/solids out of all fuel grades. It is to be understood that the present invention is not limited to the sole embodiments described above, but encompasses any and all embodiments within the scope of the following claims.

I claim:

1. A fuel/contaminant separator comprising:
   an inlet pipe;
   an outlet pipe;
   a curved nozzle assembly that includes a plurality of nozzles connected to said inlet pipe that guides a contaminated fuel from said inlet pipe to a separation section to form an interface due to centrifugal effect between a clean fuel and a contaminant mixture so that said contaminant mixture can collect in a collection section below said separation section wherein said collection section has a bottom and said clean fuel can rise up through said outlet pipe;
   a drainage valve that can be opened to release said contaminant mixture from said collection section;
   said separation section includes a replaceable wear sleeve; and
   said collection section includes a perforated cone filter where minute particles of said contaminant mixture collect at perforations of the perforated cone filter where said minute particles accumulate and fall to said bottom of said collection section.

2. A fuel/contaminant separator as recited in claim 1, wherein the perforated cone filter is supported by two support rods.

3. A fuel/contaminant separator as recited in claim 1, wherein the perforated cone filter includes a bottom support made up of a thread screw so that the perforated cone filter may be easily exchanged for a perforated cone filter of a different size so that the fuel/contaminant separator may accommodate a number of fuel grades, a number of specific gravities for contaminants, and a range of temperatures.

4. A fuel/contaminant separator as recited in claim 1, wherein the drainage valve is operated manually.

* * * * *